United States Patent
Meehan et al.

(10) Patent No.: US 9,931,908 B2
(45) Date of Patent: Apr. 3, 2018

(54) HVAC AIR INLET WITH BLEND MODE AND FRESH-RESTRICTED MODE

(75) Inventors: Trenton S. Meehan, Ann Arbor, MI (US); Vivek A. Jairazbhoy, Farmington Hills, MI (US); Steve M. Kahrs, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 2299 days.

(21) Appl. No.: 12/850,889

(22) Filed: Aug. 5, 2010

(65) Prior Publication Data

US 2012/0034859 A1  Feb. 9, 2012

(51) Int. Cl.
*B60H 1/34* (2006.01)
*B60H 1/00* (2006.01)

(52) U.S. Cl.
CPC ........... *B60H 1/00685* (2013.01); *B60H 2001/00085* (2013.01); *B60H 2001/00721* (2013.01)

(58) Field of Classification Search
CPC .......................................................... B60H 1/34
USPC ........................................ 454/139–143, 145
See application file for complete search history.

(56) References Cited

U.S. PATENT DOCUMENTS

| | | | |
|---|---|---|---|
| 5,105,730 A * | 4/1992 | Smith | 454/161 |
| 5,186,237 A * | 2/1993 | Adasek et al. | 165/42 |
| 5,203,737 A | 4/1993 | Joseph et al. | |
| 5,876,277 A * | 3/1999 | Uemura et al. | 454/139 |
| 6,450,877 B2 | 9/2002 | Tsurushima et al. | |
| 6,789,607 B1 | 9/2004 | Jun et al. | |
| 7,357,176 B2 | 4/2008 | Yelles | |
| 7,407,001 B2 | 8/2008 | Newman et al. | |
| 7,431,638 B2 * | 10/2008 | Natsume et al. | 454/121 |
| 7,520,804 B2 * | 4/2009 | Venkatappa et al. | 454/139 |
| 7,530,889 B2 * | 5/2009 | Marshall et al. | 454/121 |
| 7,563,159 B2 | 7/2009 | Newman et al. | |
| 8,074,709 B2 * | 12/2011 | Park et al. | 165/202 |
| 8,113,268 B2 * | 2/2012 | Stevenson | 165/42 |
| 8,145,383 B2 * | 3/2012 | Prokhorov | 701/36 |

(Continued)

*Primary Examiner* — Steven B McAllister
*Assistant Examiner* — Samantha Miller
(74) *Attorney, Agent, or Firm* — Vichit Chea; MacMillan, Sobanski & Todd, LLC

(57) ABSTRACT

An air inlet system for an automotive HVAC system has a housing comprising a first cylindrical segment enclosing an interior space and having a first radial surface with a first angular divergence. The first radial surface has a fresh air aperture and a recirculation aperture for radially receiving fresh air and recirculated air, respectively. The housing further comprises an outlet body with an exit aperture. A pivoting door element is mounted in the interior space and shaped as a second cylindrical segment with a second radial surface with a second angular divergence which is less than the first angular divergence. The door element has a pivot axis that allows the second radial surface to slide along the first radial surface. The door element pivots to selectably align the opening with the fresh air aperture or the recirculation aperture in order to 1) block the fresh air aperture without blocking the recirculation aperture, 2) simultaneously block portions of the fresh air aperture and the recirculation aperture, 3) block the recirculation aperture without blocking any of the fresh air aperture, or 4) block the recirculation aperture while blocking only a portion of the fresh air aperture.

7 Claims, 6 Drawing Sheets

(56) References Cited

U.S. PATENT DOCUMENTS

| | | |
|---|---|---|
| 8,235,649 B2 * | 8/2012 | Kang et al. .................... 415/102 |
| 2002/0013128 A1 * | 1/2002 | Maruyama et al. .......... 454/139 |
| 2002/0025772 A1 * | 2/2002 | Egami et al. ................. 454/121 |
| 2002/0084058 A1 * | 7/2002 | Ozeki et al. .................... 165/42 |
| 2006/0201174 A1 | 9/2006 | Marshall et al. |
| 2007/0218824 A1 | 9/2007 | Bailey |

* cited by examiner

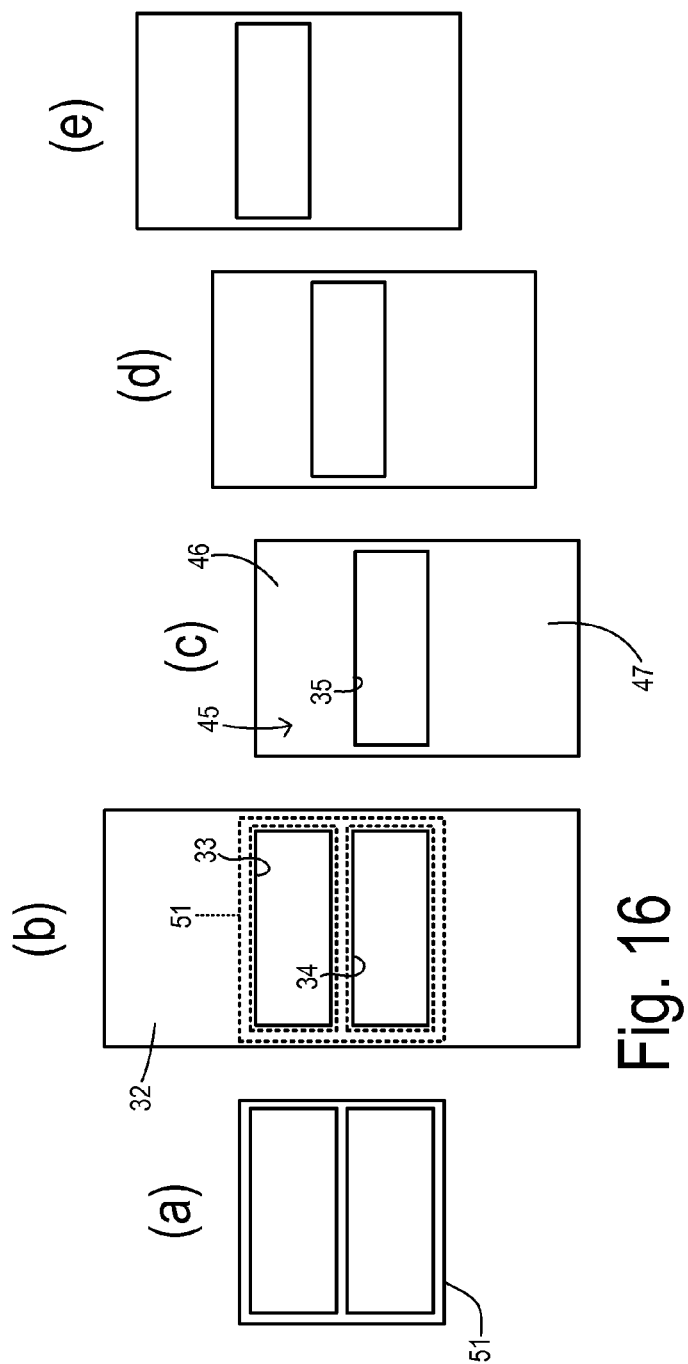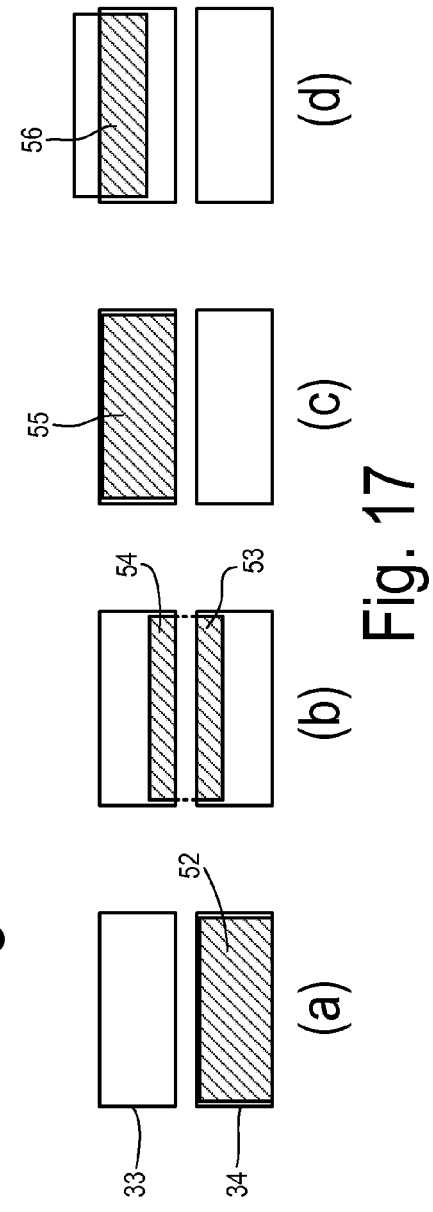

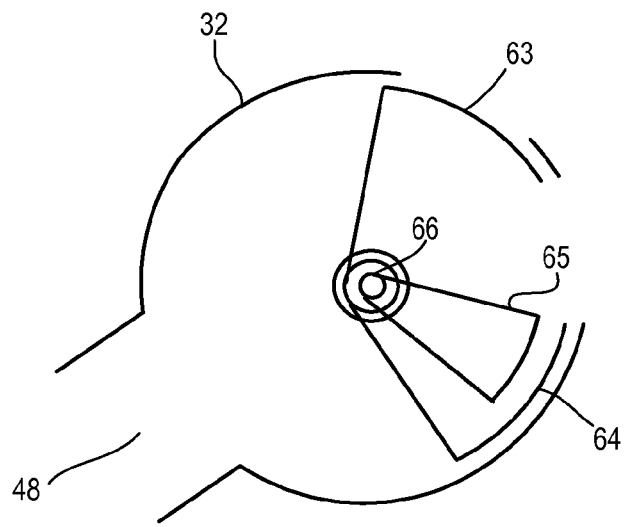
Fig. 22
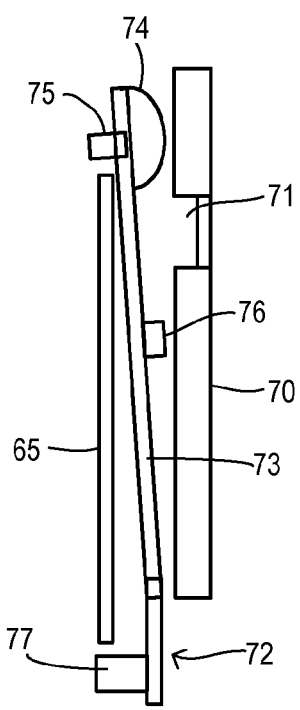 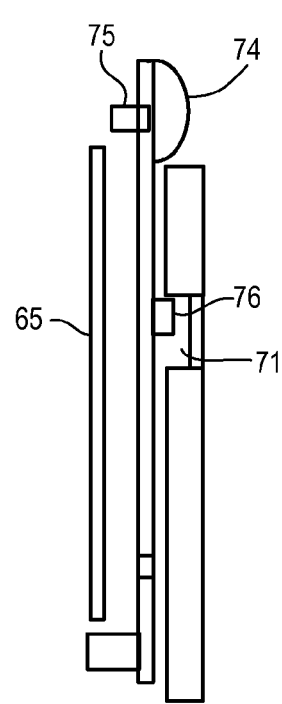 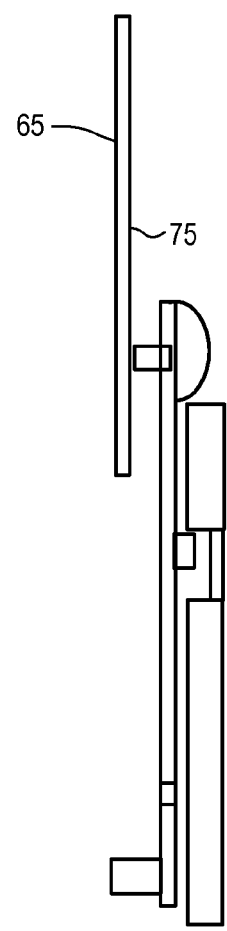
Fig. 23　　Fig. 24　　Fig. 25

HVAC AIR INLET WITH BLEND MODE AND FRESH-RESTRICTED MODE

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to automotive heating, ventilating, and air conditioning (HVAC) systems, and, more specifically, to an air inlet system for selectably supplying a blower with fresh air, recirculated air, or a blend of fresh and recirculated air.

An air inlet mechanism of a typical HVAC system is used to control the blend of inflowing air from two air source passages into the blower for passing the air across one or more heat exchangers before distributing it to the passenger compartment. Fresh outside air is available from one air source passage and recirculated cabin air is available from the other. The inlet mechanism settings determine the mix of air coming from each source. Each setting is referred to as a mode. The modes may include 1) fully recirculated, 2) fresh and recirculated combined (otherwise known as blend), 3) fully fresh, and 4) Fresh Restricted.

Conventional inlet mechanisms employ movable doors or dampers. Implementing fully recirculated and fully fresh modes is typically achieved using a single door. The Blend mode can be implemented by moving the single door to an intermediate position at which air can enter the HVAC via both air source passages. By blending the air sources in the Blend mode, a desired temperature effect can be obtained.

In modern vehicles with smaller, more efficient engines designed to meet increased fuel economy requirements, it has become more difficult to meet heater and defrost performance criteria. Blend strategies address this issue by harnessing the energy savings associated with the recirculation of conditioned air from the cabin, while ensuring access to sufficient fresh air to avoid fogging.

A significant disadvantage of conventional single door blend systems is that as the vehicle speed increases, a ram air effect can force unconditioned air from the fresh air passage into the cabin via the recirculated air passage. One solution to this problem entails the use of a second door positioned in the fresh air stream to mitigate the ram air effect. The second door also permits the overall flow of air in the fully fresh mode to be controlled at higher vehicle speeds. Disadvantages include the cost of the second door and its actuator as well as increased noise since the incoming fresh air passes through two openings. Added components can also result in moving parts that generate additional squeaks, rattles, and scrapes.

It would be desirable to construct an air inlet mechanism using a single door that would include all four modes mentioned above that does not allow leakage of unconditioned air into the cabin, that allows the overall flow of air in the HVAC to be controlled at higher vehicle speeds, and that avoids additional squeaks, rattles, and scrapes.

SUMMARY OF THE INVENTION

In one aspect of the invention, an air inlet system is provided for an automotive heating, ventilating, and air conditioning (HVAC) system. The system has a housing comprising a first cylindrical segment enclosing an interior space and having a first radial surface with a first angular divergence. The first radial surface has a fresh air aperture and a recirculation aperture for radially receiving fresh air and recirculated air, respectively. The housing further comprises an outlet body with an exit aperture fluidically coupled to the interior space. A pivoting door element is mounted in the interior space and shaped as a second cylindrical segment with a second radial surface with a second angular divergence which is less than the first angular divergence. The door element has a pivot axis that allows the second radial surface to slide along the first radial surface. The second radial surface has a blocking wall surrounding an opening, wherein the door element pivots to selectably align the opening with the fresh air aperture or the recirculation aperture in order to 1) block the fresh air aperture without blocking the recirculation aperture, 2) simultaneously block portions of the fresh air aperture and the recirculation aperture, 3) block the recirculation aperture without blocking any of the fresh air aperture, or 4) block the recirculation aperture while blocking only a portion of the fresh air aperture.

BRIEF DESCRIPTION OF THE DRAWINGS

FIG. 16 illustrates relative placement between the housing and the door element with the sliding surfaces flattened onto a plane for better understanding.

FIG. 17 shows the relative overlap of the inlets and the door opening for the various air inlet modes.

FIG. 22 is a cross section showing the door element and extension of the embodiment of FIG. 18.

FIGS. 23-25 are side views of one embodiment of a latching mechanism for controlling the position of the extension of FIG. 22.

DETAILED DESCRIPTION OF PREFERRED EMBODIMENTS

Figure 1:
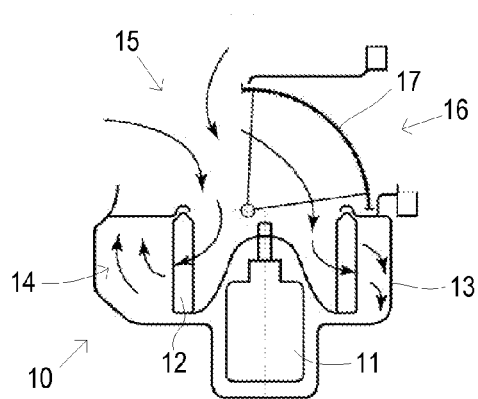
FIGS. 1-5 are schematic views of a blower system using a football-style door of the prior art, including a second butterfly door to enable fresh restricted mode.
Figure 2:
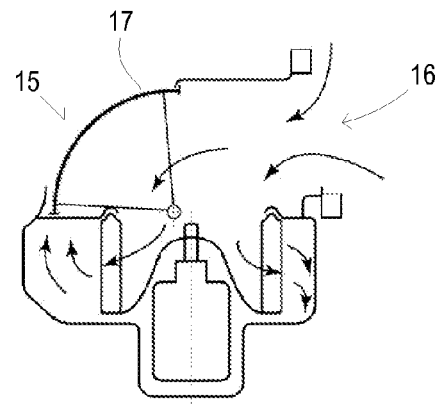

One conventional type of air inlet mechanism using what is known as a football-style door as shown in FIGS. 1 and 2. A blower system 10 has an electric motor 11 driving a set of blades 12 which are all contained in a housing 13. Inlet air is blown by set of blades 12 into an outlet 14 from blower system 10. Housing 13 includes a recirculation inlet 15 and a fresh air inlet 16 which may be controllably blocked by football door 17 which is shown in the full recirculation mode in FIG. 1. By pivoting door 17 fully counterclockwise as shown in FIG. 2, a full fresh mode is obtained. Football door 17 may also be pivoted to an intermediate position where it blocks complementary portions of the recirculation inlet and fresh air inlet to provide a blend mode.

Figure 3:
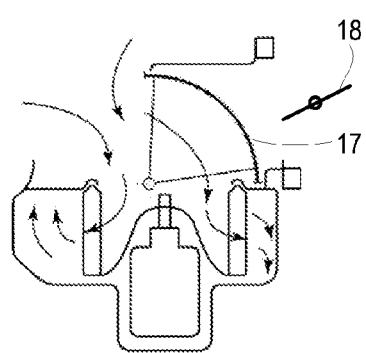
Figure 4:
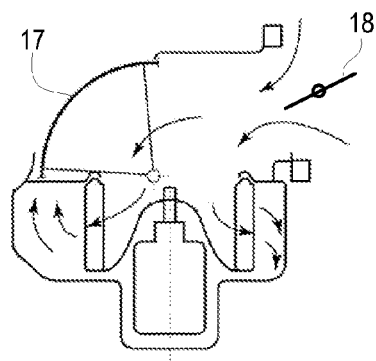
Figure 5:
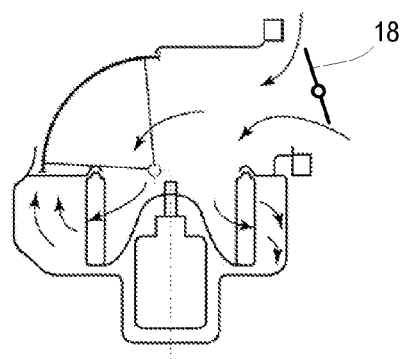

In order to provide a fresh restricted mode in connection with the football-style door, a butterfly door 18 is provided as shown in FIGS. 3-5. With butterfly door 18 in its open position, football door 17 may be positioned to select between a full recirculation mode and a full fresh mode as shown in FIGS. 3 and 4, respectively. When in the fresh mode, butterfly door 18 may be partially or fully closed to block a controlled portion of the fresh air passage in order to obtain a fresh restricted mode. FIG. 5 shows butterfly door 18 at its maximum closed position.

Figure 6:
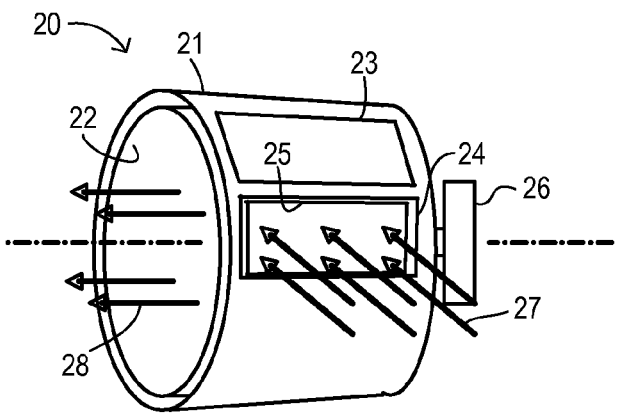
FIG. 6 is a perspective view of a barrel-style air inlet of the prior art.

FIG. 6 is a general illustration of the prior art barrel-style door. An inlet system 20 includes an outer cylindrical housing 21 and an inner cylindrical door 22. Outer cylindrical housing 21 has a first inlet 23 and a second inlet 24. Cylindrical door 22 has an opening 25 that may be rotated into alignment with inlets 23 and/or 24 to select a source of inlet air. An actuator 26 such as a motor is coupled to cylindrical door 22 through a closed end of housing 21 in order to rotate cylindrical door 22 to a desired position corresponding to the desired air inlet mode. An outlet is provided at the opposite axial end, whereby air entering in the direction shown by arrows 27 makes a right angle turn in order to exit along the direction of arrows 28. The shear generated by the right angle turn tends to increase the pressure drop across the unit which, in turn, increases the load on the blower.

Figure 7:
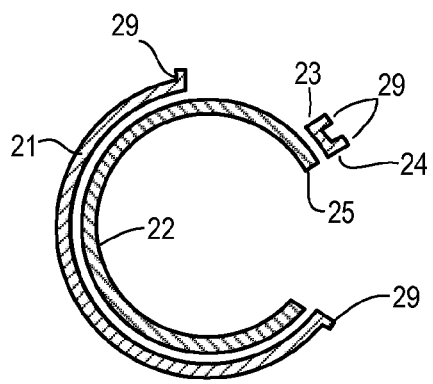
FIGS. 7-9 are cross-sectional views illustrating air inlet modes of the barrel of FIG. 6.
Figure 8:
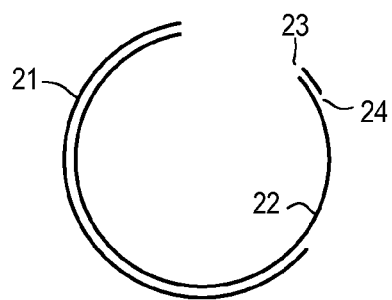
Figure 9:
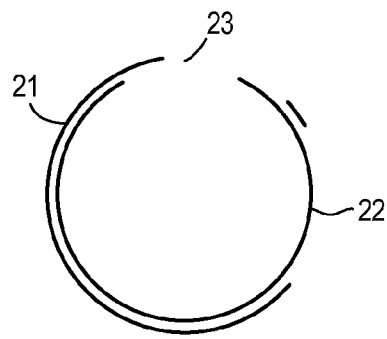

The relative arrangements of the cylindrical housing and cylindrical door for obtaining the various modes are shown in cross section in FIGS. 7-9. Assuming that the recirculation passage is coupled to inlet 24, FIG. 7 shows a full recirculation mode with opening 25 aligned fully with inlet 24. As shown in FIG. 7, housing 21 may include a plurality of bosses 29 to facilitate attachment of the various passages to housing 21. Housing 21 and door 22 have a thickness as shown by the cross hatching in FIG. 7. For simplification, the thicknesses are not shown for the remaining figures.

In FIG. 8, cylindrical door 22 has been rotated counterclockwise so that opening 25 is aligned with inlet 23 while inlet 24 becomes blocked. The position shown in FIG. 8 corresponds to a full fresh mode. Rotational positions of cylindrical door 22 between those shown in FIGS. 7 and 8 provide multiple partial recirculation positions which blend recirculated air and fresh air together. There may be some specific exclusion zones within all the possible positions which cause undesirable noise or vibrations or other undesirable air flow characteristics. These exclusion zones can be programmed into a controller that is connected to actuator 26 so that only those positions with acceptable noise and performance are utilized.

FIG. 9 shows cylindrical door 22 being rotated in a further counterclockwise direction so that only a portion of inlet 23 remains unblocked. Thus, a restricted fresh mode is provided which may reduce fresh air intake at higher vehicle speeds.

Figure 10:
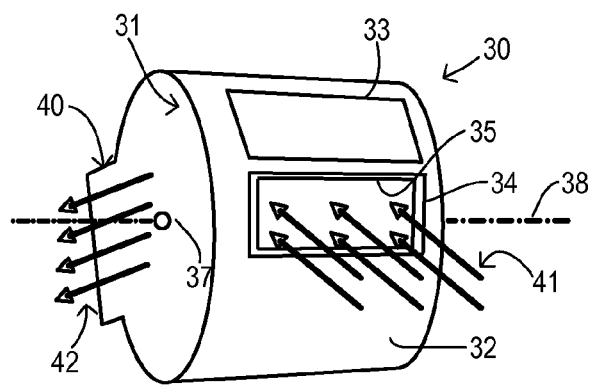
FIG. 10 is a perspective view of a housing according to one embodiment of the present invention using the shape of a cylindrical segment.
Figure 11:
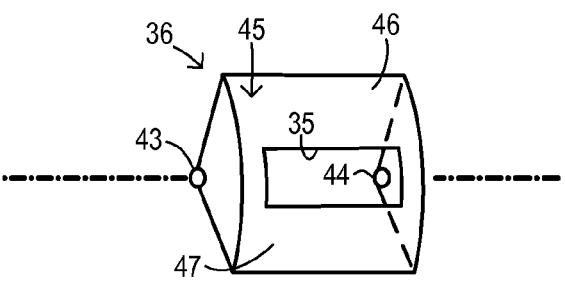
FIG. 11 is a perspective view of a pivoting door element received by the housing of FIG. 10.
Figure 12:
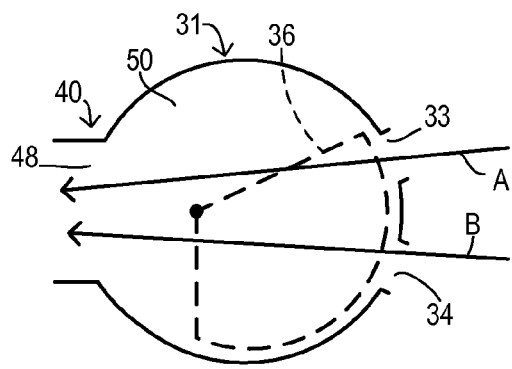
FIG. 12 is a cross section of a housing.

The present invention utilizes a shape based on a cylindrical segment, i.e., only a circumferential portion of a cylinder, which provides advantages of minimizing airflow redirection (and consequently minimizing air pressure drop) and maximizing positional control by means of pivotal door to housing bearings (and consequently improving seal performance opportunities between the door and housing). Thus, FIGS. 10-12 show a housing 30 with a first cylindrical segment 31 having a first radial surface 32. A fresh air aperture 33 and a recirculation aperture 34 are provided in radial surface 32 and are connected to inlet fresh air and recirculation air passages, respectively (not shown). In an interior space 50 of housing 30, a pivoting door element 36 as shown in FIG. 11 is received. Door element 36 has an opening 35 for selectably aligning with the apertures to create the desired air inlet modes. As shown in FIG. 10, opening 35 is aligned with recirculation aperture 34.

Housing 30 also includes an outlet body 40 with an exit aperture 48 as shown in FIG. 12. In FIG. 10, air from a recirculation passage passes through recirculation aperture 34 and opening 35 as shown by arrows 41. Air flow through the device exits along arrows 42 at outlet body 40.

Housing 30 defines a pivot 37 having an axis 38 arranged axially with respect to radial surface 32. Door element 36 in FIG. 11 includes pivot points 43 and 44 that facilitate the mounting of door element 36 within interior space 50 of housing 30 so that door element 36 pivots about axis 38. Door element 36 is shaped as a second cylindrical segment complementary to a portion of the first cylindrical segment of the housing, wherein the second cylindrical segment has a second radial surface 45 into which opening 35 is formed. Radial surface 45 includes first and second panel sections 46 and 47 on opposite circumferential sides of opening 35. Panel sections 46 and 47 are slideable along radial surface 32 of housing 30 to selectably align opening 35 with aperture 33 and/or aperture 34. By acting as a blocking wall, panel sections 46 and 47 together with opening 35 can be positioned in order to create the various air inlet modes, including 1) a full recirculation mode wherein the fresh air aperture is blocked without blocking the recirculation aperture, 2) a blend mode wherein portions of the fresh air aperture and recirculation aperture are simultaneously blocked, 3) a full fresh mode wherein the recirculation aperture is blocked without blocking any of the fresh air aperture, and 4) a restricted fresh only mode wherein the recirculation aperture is blocked while blocking only a portion of the fresh air aperture. As a result of the cylindrical segment shapes used in the present invention, exit aperture 48 extends opposite of cylindrical segment 31 so that straight-line flow paths A and B are provided between exit aperture 48 and inlet apertures 33 and 34, respectively. Thus, air flowing through the device does not significantly change direction.

As shown in FIGS. 10 and 12, outlet body 40 may have a substantially rectangular profile. However, other shapes can be used according to the desired interface with the blower itself and the packaging space that may be available.

Although apertures 33 and 34 and opening 35 are shown with substantially rectangular shapes, other shapes are also possible. Different shapes resulting in a gradation of surface areas as the pivot position of the door element is changed can be used to create non-linear changes in the flow characteristics for specific changes in the pivot positioning. In other words, a metering function can be obtained by selecting shapes that vary the amount of air flow surface area changes according to different pivotable movements of the door element.

Figure 13:
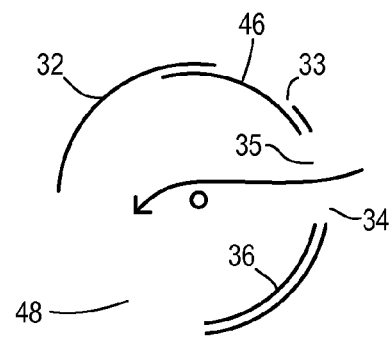
FIGS. 13-15 are cross-sectional views illustrating air inlet modes for one embodiment of the present invention.
Figure 14:
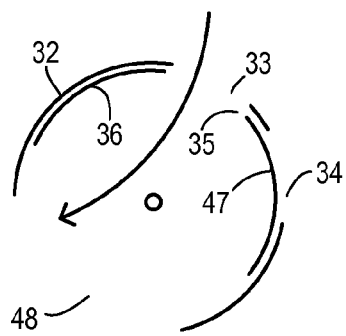
Figure 15:
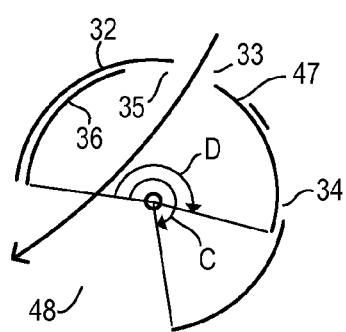

FIG. 13 is a cross-sectional, schematic view of housing 32 and pivoting door element 36 in the full recirculation mode. Thus, opening 35 is aligned with aperture 34 allowing airflow from the recirculation passage while panel section 46 blocks aperture 33. Similarly, FIG. 14 shows the full fresh mode wherein aperture 34 is blocked by panel section 47 and opening 35 is aligned with aperture 33. Further counterclockwise pivoting of door element 36 provides the restricted fresh only mode as shown in FIG. 15. Thus, panel section 47 encroaches on aperture 33 by a controlled amount thereby reducing the available opening. In FIG. 15, door element 36 is rotated in the counter clockwise direction to its maximum extent. The available pivoting rotation of door element 36 depends on the difference in the central arcs that define the respective cylindrical segments. A cylindrical segment is formed by removing a longitudinal slice of a full cylinder wherein the slice is defined by a pair of cutting planes that each contains the central longitudinal axis of the cylinder. The angular divergence of the cutting planes as measured within the remaining cylindrical segment define the corresponding radial surface.

As shown in FIG. 15, housing 32 has an angular divergence C while door element 36 has an angular divergence D which is less than angular divergence C. The difference between the angles corresponds to the maximum pivotal movement of door element 36. In the preferred embodiment, if fresh air aperture 33 and recirculation aperture 34 are symmetrically placed within the radial surface of housing 32, then opening 35 is asymmetrically placed between panel sections 46 and 47 of door element 36 so that panel section 47 has a sufficiently great extent to block both aperture 34 and a portion of aperture 33 in the restrictive fresh only mode.

FIG. 16 illustrates the relationship of opening 35 with apertures 33 and 34 in greater detail. Radial surfaces 32 and 45 have been flattened into a plane for clearer illustration. In FIG. 16(a), a seal 51 is shown which is applied to the periphery of openings 33 and 34 in FIG. 16(b). Seal 51 is an elastomeric material allowing the door element to slide along it while maintaining a seal against leaking of air. FIG. 16(c) shows opening 35 which is aligned with aperture 34 at one end of the pivotal movement of the door element. FIG. 16(d) shows a first amount of pivotal movement of the door element resulting in alignment of opening 35 with both apertures 33 and 34 in the blend mode. Due to the asymmetrical placement of opening 35, further pivotal movement of the door element allows opening 35 to pivot beyond its complete alignment with aperture 33, thereby resulting in a controllable opening for the restricted fresh only mode in FIG. 16(e).

The corresponding openings for passage of air in the respective modes are further illustrated in FIG. 17. In FIG. 17(a), an air opening 52 results from the alignment from aperture 34 with opening 35 corresponding to the full recirculation mode. In the blend mode, openings 53 and 54 shown in FIG. 17(b) are presented to the recirculation passage and the fresh air passage, respectively. In the full fresh mode, an opening 55 is presented to the fresh air passage as shown in FIG. 17(c). FIG. 17(d) shows a reduced size opening 56 obtained in the restrictive fresh only mode.

Figure 18:
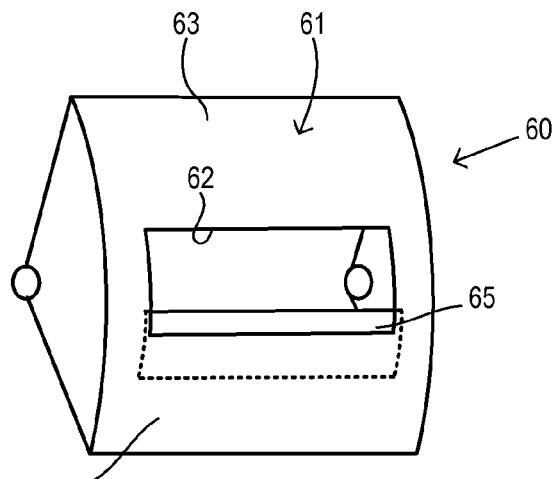
FIG. 18 is a perspective view of a door element according to another embodiment of the invention.

An alternative embodiment of the invention employs a movable panel extension on the pivoting door element that can be used to adjust the size of the door opening without further pivoting of the door element. As shown in FIG. 18, a pivoting door element 60 has a radial surface 61 containing an opening 62. Radial surface 61 has a first panel section 63 and a second panel section 64. A movable panel extension 65 is mounted within door element 60 for sealing off a selectable portion of opening 62 under control of an actuator (not shown). By virtue of panel extension 65, it becomes possible to locate opening 62 symmetrically at the center of radial surface 61 while still obtaining a restricted fresh only mode. Symmetrical placement of opening 62 may reduce the overall size of the housing.

Figure 19:
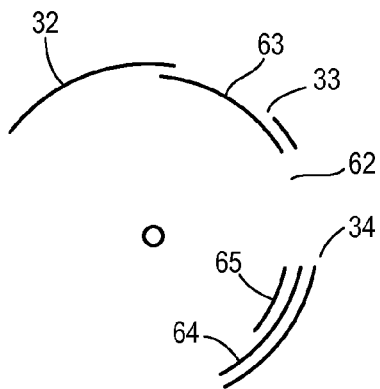
FIGS. 19-21 are cross-sectional views illustrating air inlet modes for the embodiment of FIG. 18.
Figure 20:
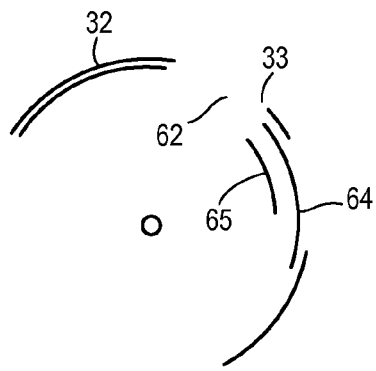
Figure 21:
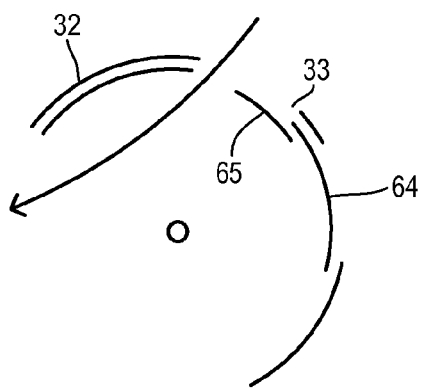

In one preferred embodiment, movable panel extension 65 is activated only in connection with the restricted fresh only mode. FIG. 19 shows a cross-sectional schematic view of the full recirculation mode in which opening 62 is aligned with recirculation aperture 34 and movable panel extension 65 is in a fully retracted position. Panel section 63 blocks fresh air aperture 33. Pivoting of door element 60 while movable panel extension 65 remains retracted achieves the blend mode and the full fresh mode in the same manor as the previous embodiments. FIG. 20 shows the full fresh mode wherein panel section 64 blocks aperture 34 with opening 62 fully aligned with fresh air aperture 33. FIG. 21 shows movable panel extension 65 in an extended position for blocking a selectable portion of opening 62 to provide the restricted fresh only mode. As shown in cross section in FIG. 22, movable panel extension 65 may comprise a pivotable element for rotating about a pivot point 66 in common with the pivot point of the door element.

The movable panel extension may preferably interface with the pivotable door element via a latching mechanism that keeps the panel extension in a retracted position until the full fresh mode is reached and then unlatches for deployment of the panel extension into the restricted fresh only mode. The movable panel extension may be driven by either the same actuator for driving the door element or a separate actuator (not shown).

FIGS. 23-25 show a latching mechanism 72 and its deployment during operation of the air inlet mechanism. A stationary portion of an outer housing wall 70 includes a detent 71 located at a reference position corresponding to a point where rotation of the door element achieves the full fresh mode. Latch 72 includes an arm 73 that extends to a first projection 74 on the housing side and a second projection 75 on the interior side. First projection 74 has a rounded surface to act as a ramp. A third projection 76 extends at an intermediate point of arm 73 toward housing 70. A fourth projection 77 extends from arm 73 toward the interior. When in its retracted position, movable panel extension 65 is retained between projections 75 and 77.

When the pivoting door element reaches the full fresh position, projection 70 enters detent 71 as shown in FIG. 24. Projection 74 reaches a notch shown at the top of housing wall 70 thereby allowing arm 73 to straighten under its spring force thereby moving projection 75 out of the way of panel extension 65. That allows panel extension 65 to extend into the restricted fresh only mode as shown in FIG. 25.

What is claimed is:

1. An air inlet system for an automotive heating, ventilating, and air conditioning (HVAC) system, comprising:

a housing comprising a first cylindrical segment enclosing an interior space and having a first radial surface with a first angular divergence, the first radial surface having a fresh air aperture and a recirculation aperture for radially receiving fresh air and recirculated air, respectively, wherein the housing further comprises an outlet body with an exit aperture fluidically coupled to the interior space; and a pivoting door element mounted in the interior space and shaped as a second cylindrical segment with a second radial surface with a second angular divergence which is less than the first angular divergence, wherein the door element has a pivot axis that allows the second radial surface to slide along the first radial surface, wherein the second radial surface has a blocking wall surrounding an opening, and wherein the door element pivots to selectably align the opening with the fresh air aperture or the recirculation aperture in order to 1)

block the fresh air aperture without blocking the recirculation aperture, 2) simultaneously block portions of the fresh air aperture and the recirculation aperture, 3) block the recirculation aperture without blocking any of the fresh air aperture, or 4) block the recirculation aperture while blocking only a portion of the fresh air aperture.

2. The system of claim 1 wherein the outlet body extends opposite the first cylindrical segment so that straight-line flow paths exist from the fresh air aperture through the exit aperture and from the recirculation aperture through the exit aperture.

3. The system of claim 1 wherein the fresh air aperture and the recirculation aperture are substantially rectangular.

4. The system of claim 1 wherein the outlet body has a substantially rectangular profile.

5. The system of claim 1 wherein the blocking wall is comprised of first and second panel sections on opposite circumferential sides of the opening, and wherein the opening is asymmetrically placed between the panel sections so that the pivoting door element can be moved to selectably block a portion of the fresh air aperture while the recirculation aperture remains completely blocked.

6. The system of claim 1 further comprising a movable panel extension mounted with the pivoting door element for blocking a selectable portion of the opening.

7. An HVAC inlet system comprising:
a housing with a fresh air inlet, a recirculation inlet, and an outlet; and
a door element pivotally mounted in the housing with a sealing surface slidable with respect to the fresh air and recirculation inlets, wherein the sealing surface includes an opening selectably positioned at the inlets for providing:
a full recirculation mode;
a blend mode;
a full fresh mode; and
a restricted fresh only mode.

* * * * *